United States Patent [19]

Kubota et al.

[11] Patent Number: 4,659,150

[45] Date of Patent: Apr. 21, 1987

[54] ELECTRONIC CONTROL SYSTEM FOR AUTOMOTIVE BRAKE SYSTEM FOR CONTROLLING BRAKE PRESSURE IN ACCORDANCE WITH VEHICULAR LOAD

[75] Inventors: Hitoshi Kubota, Minami-ashigara; Hideaki Oda, Hamakita, both of Japan

[73] Assignee: Nissan Motor Company, Limited, Kanagawa, Japan

[21] Appl. No.: 760,561

[22] Filed: Jul. 30, 1985

[30] Foreign Application Priority Data

Jul. 31, 1984 [JP] Japan .................................. 59-159203

[51] Int. Cl.$^4$ ................................................ B60T 8/18
[52] U.S. Cl. .................................. 303/6 C; 188/195; 188/349; 303/15; 303/22 R
[58] Field of Search .................. 303/22 R, 6 C, 22 A, 303/24 A, 23 R, 24 C, 23 A, 24 F, 20, 15, 100, DIG. 1, DIG. 3; 188/349, 195

[56] References Cited

U.S. PATENT DOCUMENTS

| 4,289,358 | 9/1981 | Dufft et al. | 303/22 R |
| 4,312,543 | 1/1982 | Kubota | 303/6 C X |
| 4,358,163 | 11/1982 | Young | 303/22 R |
| 4,453,778 | 6/1984 | Smith et al. | 303/22 R |
| 4,502,735 | 3/1985 | Kubota | 303/6 C X |
| 4,560,208 | 12/1985 | Kubota | 303/6 C |

FOREIGN PATENT DOCUMENTS 032435 7/1981 European Pat. Off. .
062246 10/1982 European Pat. Off. .
2043189 10/1980 United Kingdom .
2065251 6/1981 United Kingdom .

*Primary Examiner*—Douglas C. Butler
*Attorney, Agent, or Firm*—Schwartz, Jeffery, Schwaab, Mack, Blumenthal & Evans

[57] ABSTRACT

An electronic brake control system, according to the present invention, has a controller. The controller employs a memory which stores a table or map representing split point values relative to vertical displacement between the sprung mass and the unsprung mass of the vehicle. The split point data stored in the memory are determined in accordance with the unique spring characteristics of the specific vehicle to which the brake control system is applied. The controller derives a reference pressure corresponding to the split point and compares the reference pressure with an actual hydraulic braking pressure. When the actual braking pressure is lower than the reference pressure, the controller holds a proportioning valve device inactive so as to distribute hydraulic braking pressure built up in a master cylinder among individual wheel cylinders so that the braking pressure in the wheel cylinders increases at a rate matching the rate of increase of the fluid pressure in the master cylinder. On the other hand, when the actual braking pressure is equal to or greater than the reference pressure, the controller activates the proportioning valve so as to distribute the braking pressure to the wheel cylinders such that the braking pressure in the wheel cylinder increases at a controlled rate related to the rate of pressure increase in the master cylinder.

9 Claims, 4 Drawing Figures

ELECTRONIC CONTROL SYSTEM FOR AUTOMOTIVE BRAKE SYSTEM FOR CONTROLLING BRAKE PRESSURE IN ACCORDANCE WITH VEHICULAR LOAD

BACKGROUND OF THE INVENTION

The present invention relates generally to an electronic control system for an automotive brake system, which controls hydraulic brake pressure in accordance with the load on the vehicle so as to prevent the vehicular wheels from locking. More specifically, the invention relates to an electronic automotive brake control system which controls the distribution of hydraulic brake pressure in a master cylinder of the brake system.

It should be noted that, throughout the disclosure, the word "load" means the physical weight on the vehicle due to passengers and/or luggage.

Conventionally, various kinds of load-dependent vehicular brake controls have been developed and proposed. One typical prior art system in this field is a linkage-type load-sensing proportioning valve disposed within a hydraulic circuit for rear wheel brakes. In brake control systems employing this linkage-type proportioning valve, the vertical displacement between the vehicle body, i.e. the sprung mass and wheel axles, i.e. the unsprung mass is detected to serve as a load-indicative parameter. The load value corresponding to the detected vertical displacement is applied to the proportioning valve to adjust the split point of the hydraulic braking pressure depending upon load on the vehicle.

This conventional brake control system can effectively adjust braking pressure as long as the suspension coil springs exhibit linear spring force characteristics so that the spring force increases linearly with vertical displacement between the sprung mass and unsprung mass. However, if the springs have non-linear spring force characteristics, it becomes difficult to detect the actual load distribution among the vehicular wheels, especially between the front and rear wheels. This tends to cause earlier locking of the rear wheels when the vehicular load is between the unloaded condition and fully-loaded condition.

This defect can be solved by adjusting the split point in the proportioning valve to match the non-linear spring characteristics of the suspension springs. However, in this case, different proportioning characteristics would be required for the proportioning valves for various types of vehicles employing different non-linear suspension springs. This prevents common use of the proportioning valves for different types of vehicles. This results in an unnecessarily expensive brake control system.

SUMMARY OF THE INVENTION

Therefore, it is an object of the present invention to provide an electronic automotive brake control system which allows common use of a proportioning valve in various types of vehicles and which adjusts the split point in precise correspondence to the load on the vehicle so as to obtaining optimum wheel-lock-up protection.

In order to accomplish the aforementioned and other objects, an electronic brake control system, according to the present invention, has a controller. The controller includes a memory which stores a table or map plotting the optimal split point value relative to the vertical displacement between the sprung mass and unsprung mass of the vehicle. The split point data stored in the memory is determined by the unique spring chracteristics of the specific vehicle to which the brake control system is applied. The controller derives a reference pressure corresponding to the split point and compares the reference pressure to the actual hydraulic braking pressure. When the actual braking pressure is lower than the reference pressure, the controller holds a proportioning valve device inactive so as to distribute hydraulic braking pressure built-up by a master cylinder among wheel cylinders such that the braking pressure in the wheel cylinders increases at a rate corresponding to the rate of increase of fluid pressure in the master cylinder. On the other hand, when the actual braking pressure is equal to or greater than the reference pressure, the controller activates the proportioning valve, which then distributes the braking pressure to the wheel cylinders such that the braking pressure in the wheel cylinder increases at a controlled rate relative to the pressure increase in the master cylinder.

According to one aspect of the invention, an automotive brake system comprises a master cylinder associated with a manual brake operator means for building up hydraulic pressure, a wheel cylinder connected to the master cylinder through a hydraulic circuit for receiving the hydraulic pressure and braking an associated vehicular wheel, a pressure control valve means disposed within the hydraulic circuit, the valve means including a reference pressure setting means for setting a reference pressure, the valve means conducting the hydraulic pressure from the master cylinder to the wheel cylinder so as to increase the hydraulic pressure in the wheel cylinder at a rate matching the rate of increase of the hydraulic pressure in the master cylinder while the hydraulic pressure in the master cylinder is below the reference pressure, and to increase the hydraulic pressure in the wheel cylinder at a controlled rate related to the rate of increase of the hydraulic pressure in the master cylinder when the master cylinder pressure exceeds the reference pressure, a detector for detecting the load on the vehicle and producing a load condition indicative signal, a sensor for monitoring the hydraulic pressure in the master cylinder and producing a pressure indicative signal, and a controller responsive to the load condition indicative signal to derive the reference pressure value corresponding to the reference pressure to be set by the reference pressure setting means on the basis of a predetermined relationship between the load condition indicative signal value and the reference pressure value, the controller responsive to a pressure indicative signal value exceeding the reference pressure value to output a control signal ordering the reference pressure setting means to set the reference pressure at the level derived on the basis of the load condition indicative signal value.

According to another aspect of the invention, a proportioning valve device for a hydraulic automotive brake system which includes a master cylinder for accumulating hydraulic pressure to a level related to the disposition of a manually operable brake application means, a wheel cylinder for receiving the hydraulic pressure from the master cylinder via a hydraulic circuit and applying braking force to a vehicular wheel, the proportioning valve being disposed within the hydraulic circuit and comprises a housing with a first fluid path connecting an inlet port connected to the master cylinder and an outlet port connected to the wheel cylinder, a first valve disposed within the fluid path and movable between first and second positions in which it respectively establishes and blocks fluid communication between the inlet port and the outlet port, a bias spring for biasing the first valve toward the first position at a given set pressure serving as a reference pressure, a reference pressure setting means cooperating with the spring to adjust the set pressure of the spring, a detector sensitive to the load on the vehicle for producing a load condition indicative signal, a sensor for monitoring the hydraulic pressure in the master cylinder and producing a pressure indicative signal, and a controller responsive to the load condition indicative signal to derive a reference pressure value corresponding to the reference pressure to be set by the reference pressure setting means on the basis of a predetermined relationship between the load condition indicative signal value and the reference pressure, the controller being responsive to a pressure indicative signal value exceeding the reference pressure value to output a control signal ordering the reference pressure setting means to set the reference pressure to the level derived on the basis of the load condition indicative signal value.

BRIEF DESCRIPTION OF THE DRAWINGS

The present invention will be understood from the detailed description given herebelow and from the accompanying drawings of the preferred embodiment of the invention, which however, should not be taken to limit the invention to the specific embodiment of the invention, but are for explanation and understanding only.

In the drawing.

DESCRIPTION OF THE PREFERRED EMBODIMENT

Figure 1:
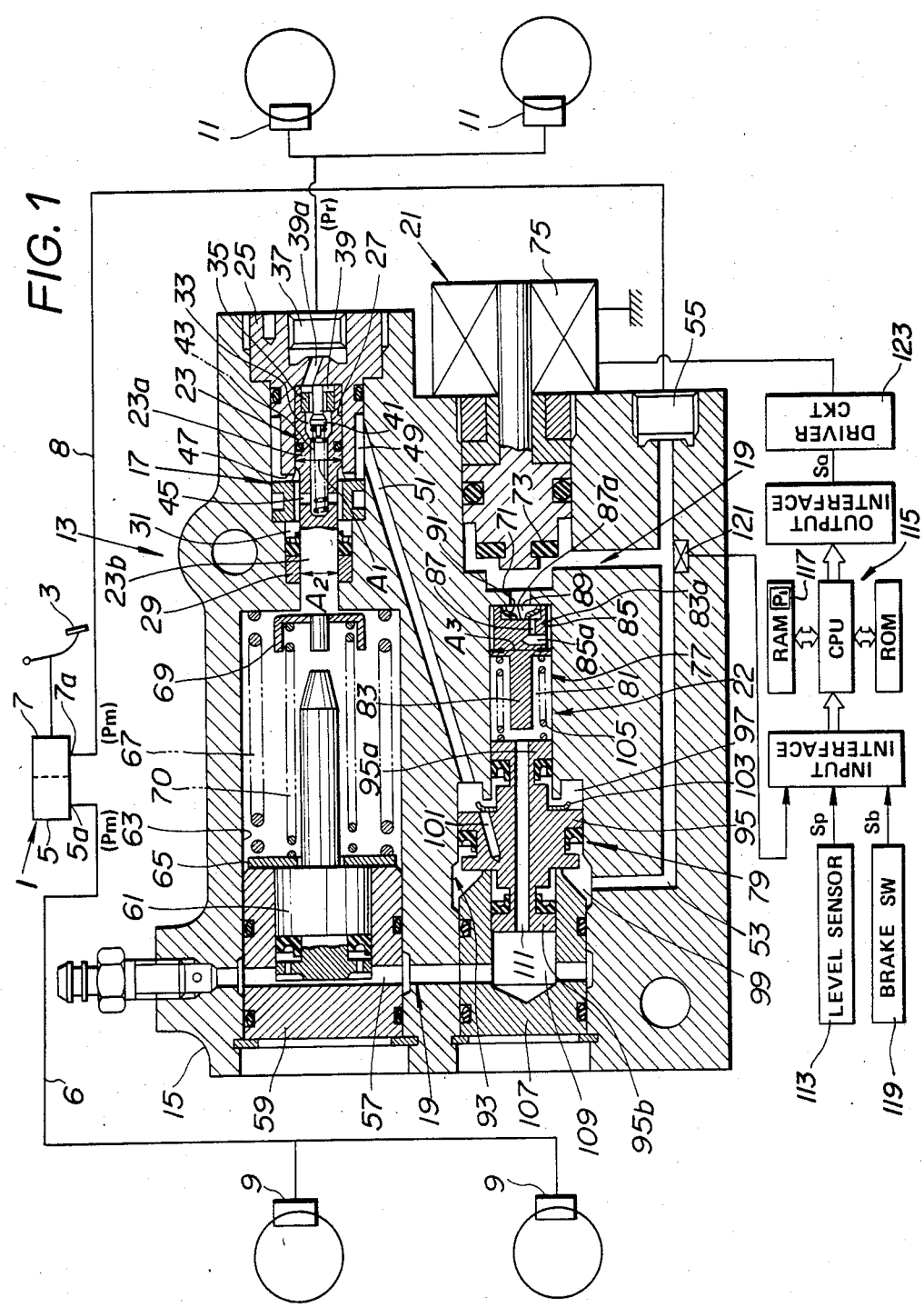
FIG. 1 is a diagram of the preferred embodiment of an electronic automotive brake control system according to the present invention.

Referring now to the drawings, particularly to FIG. 1, the preferred embodiment of an electronic control system for an automotive brake system according to the present invention generally comprises a master cylinder 1 cooperating with a brake pedal 3 for building up hydraulic pressure in accordance with the depression of the brake pedal. The automotive brake system further comprises a front brake system hydraulic circuit 6 which will be referred to hereafter as "front hydraulic circuit", a rear brake system hydraulic circuit 8 which will be referred to hereafter as "rear hydraulic circuit", front brake system wheel cylinders 9 which will be referred to hereafter as "front wheel cylinder" or "front wheel cylinders", rear brake system wheel cylinders 11 which will be referred to hereafter as "rear wheel cylinder" or "rear wheel cylinders", and a proportioning valve device 13 disposed in the rear hydraulic circuit.

The master cylinder 1 is divided into a primary pressure chamber 5 and a secondary pressure chamber 7. In the shown embodiment, the master cylinder 1 builds up hydraulic pressure Pm equally in the primary and secondary pressure chambers 5 and 7 according to the depression of the brake pedal 3. The master cylinder 1 also has a primary port 5a opening into the primary pressure chamber 5 and a secondary port 7a opening into the secondary chamber 7. The rear hydraulic circuit 8 is connected to the primary port 5a to connect the primary pressure chamber 5 to the rear wheel cylinders 11. The front hydraulic circuit 6 is connected to the secondary port 7a to connect the secondary pressure chamber 7 to the front wheel cylinders 9.

The proportioning valve device 13 has an inlet port 55 connected to the secondary port 7a of the master cylinder 1 and an outlet port 37 connected to the rear wheel cylinders 11. The proportioning valve device 13 comprises a housing 15 enclosing a pressure control valve 17, a passage 19, a solenoid valve 21 and a pressure sensor valve 22.

The pressure control valve 17 controls output pressure Pr to the rear wheel cylinders 11 relative to the input pressure Pm from the master cylinder 1. The pressure control valve 17 includes a plunger 23. The plunger 23 has a larger-diameter section 23a disposed within a valve chamber 27 within a plug 25 engaged to the housing 15 in liquid-tight fashion, which valve chamber 27 has internal diameter A1. The section 23a of the plunger 23 is free to slide with respect to the internal periphery of the valve chamber 27 of the plug 25. The plunger 23 also has a smaller-diameter section 23b. The section 23b is free to slide along a retainer 29 which defines an opening with a diameter A2 smaller than the internal diameter A1 of the valve chamber 27. The retainer 29 and the section 23b of the plunger 23 define a first chamber 31.

A valve bore 33 passes through the section 23a. A valve seat member 35 is secured to the inner periphery of the opening of the valve bore 33. A second chamber 39 is defined between the end of the plunger 23 and the floor of the plug 25. The second chamber 39 is in communication with the outlet port 37 via a fluid passage 39a.

A poppet valve 41 is disposed within the valve bore 33. The poppet valve 41 is normally biased toward the valve seat member 35 by means of a spring 43 which is also disposed within the valve bore 33.

The valve bore 33 is connected to the first chamber 31 via radial passages 45 passing through the smaller-diameter section 23b. Also, the valve bore 33 is connected to an annular chamber 49 via a passage 47 between the inner end of the plug and the section 23b. The annular chamber 49 is in communication with the inlet bore 55 through a first passage 51 and a second passage 53.

The passage 19 drains working fluid for pressure relief in controlling the output pressure Pr. The passage 19 establishes fluid communication between the pressure sensing valve 22 and the inlet port 55. Also, the passage 19 is in communication with a pressure accumulator chamber 57 in a plug 59 which engages the housing 15 at the end opposite from the plug 25. A pressure responsive piston 61 is disposed within the pressure accumulator chamber 57. The piston 61 separates the pressure accumulator chamber 57 from a bore 63 defined in the housing 15. The piston 61 has a stem 61a extending into the bore 63 and passing through a central opening of a spring seat 65 which loosely engages the piston stem 61a. A spring 67 disposed within the bore 63 normally biases the piston 61 toward the pressure accumulator chamber 57. The aforementioned plunger 23 opposes the bore 63 at its inner end and has a spring seat member 69. A spring 70 is seated between the spring seats 65 and 69. The spring 70 exerts a set pressure on the plunger 23.

The solenoid valve 21 blocks fluid communication through the passage 19 and thus allows the input pressure Pm from the master cylinder 1 to build up within the pressure accumulator chamber 57. For this purpose, a valve seat 71 is formed in the housing 15 opposite a valve body 73 of the solenoid valve 21. The valve body 73 is actuated by a solenoid 75.

The pressure sensing valve 22 is located between the solenoid valve 21 and the pressure accumulator chamber 57 within the passage 19. The pressure sensing valve 22 is sensitive to the rate of increase Vp of the input fluid pressure Pm and controls the increase in the fluid pressure in the pressure accumulator chamber 57 during the response lag of the solenoid valve 21, i.e. before it blocks fluid communication through the passage 19. The pressure sensing valve 22 comprises a pressure differential-sensitive section 77 and a pressure sensing section 79.

The pressure differential-sensitive valve 77 has a valve body 83. The valve body 83 has a larger diameter section 83a which is disposed within a bore 81 in the housing 15 halfway along the passage 19. The diameter A3 of the bore 81 is greater than the diameter of the passage 19. The larger diameter section 83a of the valve body has a number of axial grooves 85. The grooves 85 are in communication with a chamber 89 defined by a recess 87a in the end of the larger diameter section 83a of the valve body 83 via a radial passage 85a and an axial passage 87. The end of the axial passage 87 opening into the chamber 89 is sealed with an elastically deformable check valve 91 which comprises an elastic sealing ring.

The pressure sensing section 79 has annular chambers 97 and 99 establishing fluid communication between the fluid passages 51 and 53 which transmit the input fluid pressure to the annular chamber 49 of the pressure control valve 17. The pressure sensing section 79 also has a pressure sensor body 95 disposed within a bore 93 in the housing. The annular chamber 97 is in communication with the passage 51 and thus in communication with the annular chamber 47 of the pressure control valve 17. On the other hand, the annular chamber 99 is in communication with the inlet port 55 via the passage 53. An orifice 101 passes through the pressure sensor body 95 to establish fluid communication between the annular chambers 97 and 99. A fluid temperature responsive valve 103 controls the rate of flow of working fluid through the orifice 101. The valve 103 is made of a bimetallic material and adjusts the throttling rate depending upon the temperature of the working fluid. Specifically, as the working fluid temperature increases, the temperature responsive valve 103 constricts the flow cross-section of the end of the orifice 101 opposing the annular chamber 97. The pressure sensor body 95 also has a pair of smaller diameter section 95a and 95b. The smaller diameter section 95a is free to move axially within the chamber 81. A spring 105 disposed within the chamber 81 is compressed between one end of the smaller diameter section 95a of the pressure sensor body 95 and the pressure differential-sensitive valve body 83. The spring 105 applies a set pressure to the valve body 83. The other smaller diameter section 95b is disposed within a bore 109 in a plug 107. The bore 109 forms a part of the passage 19. An axial bore 111 passes through the pressure sensor body 95 to establish fluid communication between the chamber 81 and the bore 109.

A level sensor 113 installed in the vehicular suspension monitors relative vertical displacement between the vehicle body and the wheel axle. The level sensor 113 may be of any type or kind suitable for monitoring relative vertical displacement between the vehicle body and the wheel axle, for example, the vehicle level sensor disclosed in U. S. Pat. No. 4,290,044, issued Sept. 15, 1981. The contents of the above-identified U.S. patent are hereby incorporated by reference for the sake of disclosure. The level sensor 113 produces a level indicative signal Sp which has a value representative of the distance between the vehicle body and the wheel axle.

The level sensor 113 is connected for output to a controller 115 which comprises a microprocessor. The controller 115 is also connected for input from a pressure sensor 121 which monitors fluid pressure at the inlet port 55 and produces a pressure indicative signal Sg. The microprocessor/controller 115 has an input interface, CPU, RAM, ROM and an output interface. RAM has a memory block 117 storing a table of reference pressure values Pi.

Figure 2:
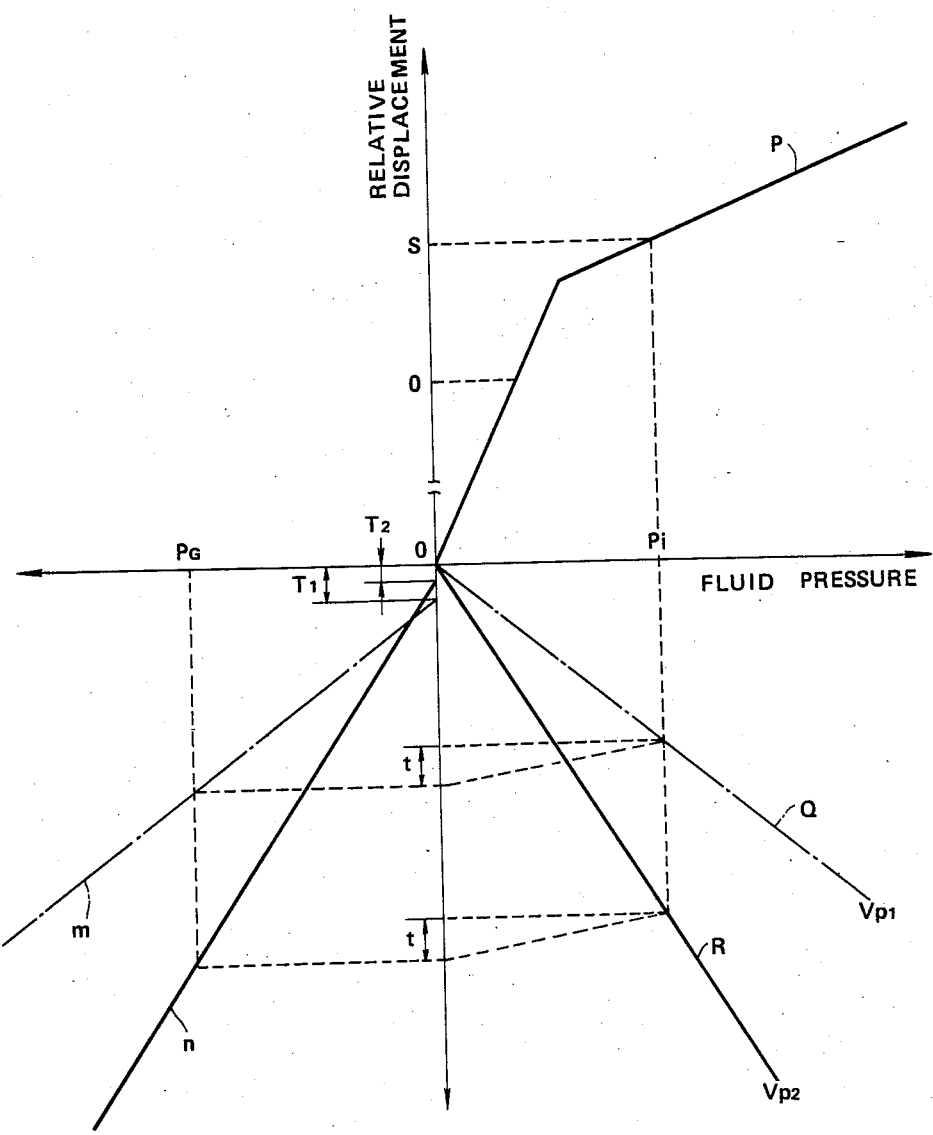
FIG. 2 is a chart of brake control characteristics of the brake control system of FIG. 1.

The line P in FIG. 2 shows the characteristics of the reference pressure Pi versus the relative distance between the vehicle body and the wheel axle, which serves as a parameter representative of the vehicular load. In practice, the relationship between the reference pressure Pi and the level indicative signal Sp is chosen to be essentially linear. The relationship between the reference pressure and the level indicative signal is uniquely related to the spring characteristics of the suspension coil springs used on the vehicle in question.

In general, the controller 115 compares the pressure indicative signal Sg representative of the input fluid pressure to the reference pressure Pi and produces a corresponding actuation signal Sq. The actuation signal Sq is fed to a driver circuit 123 which is, in turn, connected for output to the solenoid 75.

Figure 3:
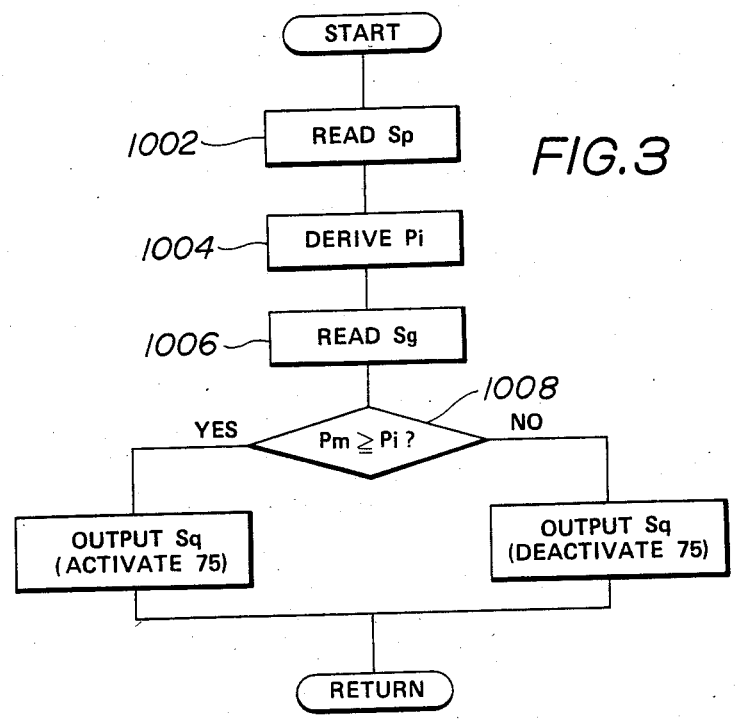
FIG. 3 is a flowchart of a brake control program executed by a controller in the control system of FIG. 2.

FIG. 3 shows a brake pressure control program executed by the controller 115. The brake pressure control program is triggered by depression of the brake pedal 3. A conventional brake switch 119 connected to the controller 115 outputs a braking condition indicative signal Sb when the brake pedal is depressed.

Immediately after starting execution of the brake pressure control program, the current level signal value Sp is read at a step 1002. Then the reference pressure Pi is derived at a step 1004 in terms of the level signal value Sp from the table stored in the memory block 117. At a step 1006, the pressure indicative signal value Sg is read. At a step 1008, the current pressure signal value Sg is compared to the newly derived reference pressure value Pi to judge whether the pressure signal value Sg is equal to or greater than the reference pressure value Pi. If the pressure signal value Sg is equal to or greater than the reference pressure value Pi, then a control signal Sq is output to the driver circuit 123 at a step 1010. On the other hand, if the pressure signal value Sg is smaller than the reference pressure value Pi, then the control signal value Sq which orders the driver circuit to remain inoperative is output to the driver circuit 123.

While the driver circuit 123 is inoperative, the solenoid 75 is also deactivated. Therefore, the fluid pressure Pm in the master cylinder 1 is transmitted to the rear wheel cylinders 11 through the proportioning valve device 13 via the inlet port 55, the fluid passage 53, the annular chamber 99, the orifice 101, the annular chamber 97, the fluid passage 51, the annular chambers 49 and 47, the radial passage 45, the bore 43, the gap between the poppet valve body 41 and the valve seat 35, the second chamber 39 and the outlet port 37. In this case, since the output pressure at the outlet port 37 is not reduced relative to the input pressure at the inlet port 55, the fluid pressure serving as hydraulic braking pressure in the rear wheel cylinders matches the pressure in the master cylinder 1.

At the same time, the front wheel cylinders 9 receive the fluid pressure Pm built up in the primary pressure chamber 5 of the master cylinder 1 directly. Therefore, the hydraulic pressure for the front wheels matches the fluid pressure built up in the master cylinder 1. Consequently, in this case, the front and rear braking pressure remain equal.

Figure 4:
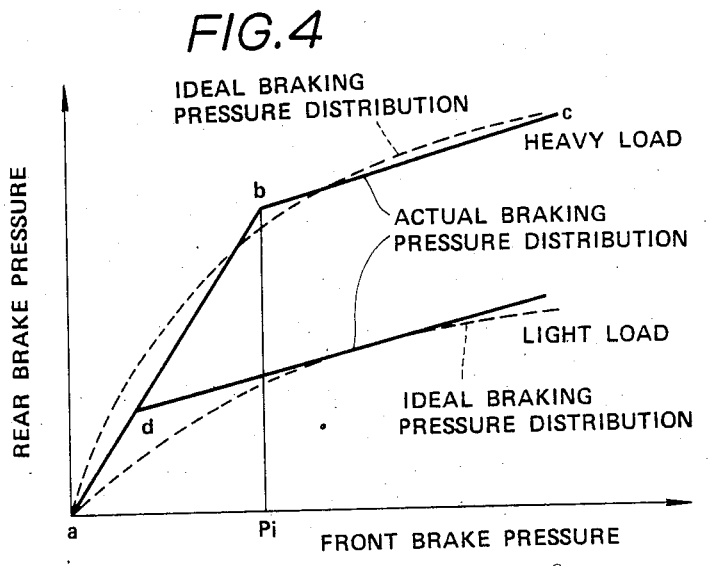
FIG. 4 is a graph showing the distribution of braking pressure between front and rear wheel cylinders.

While the front and rear braking pressures are equivalent, the braking pressure increases essentially linearly as shown in FIG. 4. In FIG. 4, the pressure range a-b shows the braking pressure characteristics while the driver circuit is inoperative and thus the proportioning valve device 13 is not active when the vehicle is unloaded. Similarly, the pressure range a-d shows the braking pressure distribution while the driver circuit is inoperative and thus the proportioning valve device 13 is not active, when the vehicle is fully loaded.

It should be noted that, in FIG. 4, the broken lines show the ideal or theoretical braking pressure distribution between the front and rear wheels.

Under the conditions described above, the fluid pressure Pm from the master cylinder 1 is also fed to the pressure accumulator chamber 57 through the proportioning valve device 13 via the inlet port 55, the passage 19, the chamber 89, axial passage 87, groove 85, bore 81, axial bore 111 and bore 109.

The pressure differential-sensitive valve 83 normally restricts fluid flow through the passage 19 due the pressure F exerted by the spring 105. This induces a time lag of T1 or T2 in FIG. 2 before the fluid pressure in the pressure accumulator chamber 57 starts to increase in response to the increase in the input fluid pressure Pm. This time lag varies with the rate of brake pedal depression. When the brake pedal is depressed abruptly, the fluid pressure Pm at the inlet prot 55 varies as shown by line Q(Vp$_1$) of FIG. 2. On the other hand, when the brake pedal is depressed relatively slowly, the fluid pressure Pm at the inlet port 55 varies as illustrated by line R(Vp$_2$) of FIG. 2. In FIG. 2, lines m and n represents the rate of change in the fluid pressure in the pressure accumulator chamber 57 in correspondence with the input fluid pressure Pm represented by the lines Q and R.

During relatively abrupt braking (Vp$_1$), a pressure difference between the annular chambers 97 and 99 develops due to the effect of the orifice 101 of the pressure sensor body 95. Specifically, when the rate of increase of the input fluid pressure Pm at the inlet port is relatively high, the fluid pressure in the annular chamber 99 become higher than that in the annular chamber to an extent great enough to overcome the spring force of the spring 105 so as to drive the sensor body 95 toward the annular chamber 97. This causes further compression of the spring 105, which further increase the pressure F on the valve body 83. After a period T1 or T2, the input fluid pressure Pm in the chamber 89 exceeds the increased pressure F. This causes the valve body 83 to move toward the sensor body 95 against the spring 105 and so establish fluid communication between the inlet port 55 and the pressure accumulator chamber 57 via the groove 85, the bore 81, the axial bore 111 and the bore 109. Immediately thereafter, the fluid pressure on both sides of the valve body 83 equalizes. This causes movement of the valve body 83 back toward the chamber 89 to block fluid communication between the inlet port 55 and the pressure accumulator chamber 57. Therefore, the fluid pressure Pm$_1$ in the pressure accumulator chamber 57 increases in a stepwise fashion. The fluid pressure variation in the pressure accumulator chamber in relation to the input fluid pressure Pm is approximated by the following equation:

$$Pm_1 = Pm - F/A_3$$

As will be apparent herefrom, the fluid pressure supplied to the pressure accumulator chamber 57 remains lower than the input fluid pressure Pm. Therefore, the rate of increase of the fluid pressure Pm$_1$ is also lower than that of the input fluid pressure Pm as shown by line m of FIG. 2.

When the fluid pressure builds up in the master cylinder relatively moderately, the time lag becomes shorter. However, the rate of increase of the fluid pressure Pm$_1$ in the pressure accumulator chamber become essentially equal to that of the input fluid pressure Pm and higher than that in the case of abrupt braking, as shown by line n of FIG. 2.

If the brake pedal 3 is depressed until the fluid pressure Pm in the master cylinder 1 exceeds the reference pressure Pi, the control signal Sq for the driver circuit 123 is output by the controller 115. As a result, the solenoid 75 of the solenoid valve 21 is energized. This causes movement of the valve body 73 toward the valve seat 71. The valve body 73 abuts the valve seat 71 to block the passage 19 upstream of the chamber 89. As a result, the pressure accumulator chamber 57 is blocked off from the inlet port 55. The accumulated fluid pressure Pm$_1$ in the pressure accumulator chamber 57 pushes the piston 61 toward the bore 63 while compressing the springs 63 and 70. This increases the spring force of the springs 63 and 70. Therefore, the pressure on the plunger 23 due to the spring 70 increases.

It should be noted that some time t is required for the solenoid 75 to energize following actuation of the driver circuit 123 by the control signal Sq as shown in FIG. 2. During this time lag t, the accumulated fluid pressure Pm$_1$ in the pressure accumulator chamber 57 applies pressure on the plunger 23 approximately equal to the reference pressure Pi. Therefore, even during the time lag t of the solenoid 75, the reference pressure can be applied to the plunger 23 at least approximately.

As the input fluid pressure Pm continues to increase via the inlet port 55, the fluid pressure in the second chamber 39 Pm exerted on the end of larger diameter section 23a of the plunger 23, which has an effective area ($\frac{1}{2} \cdot A1^2 \cdot \pi$) continues to drive the plunger toward the bore 63. At the same time, the reference pressure Pi, manifested by the force of spring 70, is exerted on the end of the smaller diameter section 23b of the plunger 23, which has an effective area ($\frac{1}{2} \cdot A2^2 \cdot \pi$). When the fluid force applied to the end of the larger diameter section 23a exceeds the force applied to the smaller diameter section 23b, the plunger 23 moves toward the bore 63 against the spring force of the spring 70. This causes the poppet valve 41 to seat onto the valve seat 35. As a result, fluid communication between the inlet port 55 and the outlet port 37 is blocked. As long as the poppet valve 41 rests in the valve seat 35 and so blocks fluid communication between the inlet port 55 and the outlet port 37 and the second chamber 39 remains blocked off from the inlet port 55, the input fluid pressure in the first chamber 31 continues to increase. This drives the plunger 23 toward the second chamber 39 until the poppet valve 41 is displaced from the valve seat 35 by contact between the stem of the poppet valve and the floor of the plug 25. This re-establishes fluid communication between the inlet port 55 and the outlet port 37. As a result, the fluid pressure in the second chamber 39 again increases to again cause movement of the plunger 23 toward the bore 63.

Thus, the output fluid pressure Pr of the proportioning valve device increases at a controlled rate related to the rate of increase of the input fluid pressure Pm at the inlet port, as illustrated by line b-c of FIG. 4. Therefore, as will be appreciated from FIG. 4, in the shown embodiment, the braking pressure distribution between the front wheel cylinders 9 and the rear wheel cylinders 11 approximates the ideal or theoretical pressure distribution.

When the brake pedal 3 is released, the input fluid pressure Pm drops to zero. This results in a pressure difference between the bore 81 and the chamber 89. Therefore, the accumulated fluid pressure $Pm_1$ in the pressure accumulator chamber 57 flows through the axial passage 87 by displacing the elastic seal 91 and out the inlet port 55.

The bimetal valve 103 at the end of the passage 101 serves to control the flow cross-section in accordance with the temperature of the working fluid.

As will be appreciated herefrom, the present invention fulfills all of the objects and advantages sought therefor.

While the invention has been disclosed in terms of the preferred embodiment of the invention, it is not intended to limit the invention to the shown embodiment. The invention should be understood to include all possible modifications of the shown embodiment and other embodiments which do not depart from the principles set out in the appended claims.

What is claimed is:
1. An automotive brake system comprising:
   a master cylinder associated with a manual brake actuator for building up hydraulic pressure;
   a wheel cylinder connected to said master cylinder through a hydraulic circuit for receiving said hydraulic pressure and braking an associated vehicular wheel;
   a pressure control valve means disposed within said hydraulic circuit, said valve means including a reference pressure setting means for setting a reference pressure, said valve means conducting said hydraulic pressure from said master cylinder to said wheel cylinder so as to increase the hydraulic pressure in said wheel cylinder at a rate matching the rate of increase of the hydraulic pressure in said master cylinder while the hydraulic pressure in said master cylinder is below said reference pressure, and to increase the hydraulic pressure in said wheel cylinder at a controlled rate related to the rate of increase of the hydraulic pressure in said master cylinder when the master cylinder pressure exceeds said reference pressure, said reference pressure setting means including a pressure accumulating means for receiving a pressurized fluid from said master cylinder for accumulating fluid pressure therein and adjusting said reference pressure set in said reference pressure setting means, said pressure reference pressure setting means also including means responsive to a rate of increase of said fluid pressure at said master cylinder for adjusting a rate of introduction of said pressurized fluid so as to increase the fluid pressure in said pressure accumulating means at a controlled rate related to the rate of increase of the fluid pressure at said master cylinder such that, when the rate of increase of the fluid pressure at the master cylinder is high, the rate of increase of the fluid pressure in the accumulating means is less than that at the master cylinder;
   a detector for detecting the load on the vehicle and producing a load condition indicative signal;
   a sensor for monitoring the hydraulic pressure in said master cylinder and producing a pressure indicative signal; and
   a controller responsive to said load condition indicative signal to derive said reference pressure value corresponding to said reference pressure to be set by said reference pressure setting means on the basis of a predetermined relationship between the load condition indicative signal value and the reference pressure value, said controller responsive to a pressure indicative signal value exceeding said reference pressure value to output a control signal ordering said reference pressure setting means to set the reference pressure at the level derived on the basis of said load condition indicative signal value.

2. The brake system as set forth in claim 1, wherein said pressure control valve means comprises a housing with a first fluid path connecting an inlet port connected to said master cylinder and an outlet port connected to said wheel cylinder, a first valve disposed within said fluid path and movable between first and second positions in which it respectively establishes and blockes fluid communication between said inlet port and said outlet port, and a bias spring cooperating with said first valve for biasing said first valve toward said first position at a given set pressure serving as said reference pressure, said reference pressure setting means controlling the force of said spring so as to adjust said set pressure to the level derived by said controller on the basis of said load condition indicative signal.

3. The brake system as set forth in claim 2, wherein said reference pressure setting means comprises a pressure accumulator chamber in said housing connected to said inlet port via a second fluid passage, a pressure responsive piston disposed within said pressure accumulator chamber and cooperating with said spring for adjusting said set pressure depending upon its position, and a pressure accumulation control valve disposed within said second fluid passage and movable between first and second positions in which it respectively establishes and blocks fluid communication between said pressure accumulator chamber and said inlet port, said pressure accumulation control valve incorporating an electrically operable actuator connected to said controller, said actuator being normally inoperative to allow said pressure accumulation control valve to assume its first position and responsive to said control signal to actuate said pressure accumulation control valve to said second position so as to hold the fluid pressure in said pressure accumulator chamber at said reference pressure.

4. An automotive brake system comprising:
a master cylinder associated with a manual brake operator means for building up hydraulic pressure;
a wheel cylinder connected to said master cylinder through a hydraulic circuit for receiving said hydraulic pressure and braking an associated vehicular wheel;
a pressure control valve means disposed within said hydraulic circuit and having a housing with a first fluid path connecting an inlet port connected to said master cylinder and an outlet port connected to said wheel cylinder, a first valve disposed within said fluid path and movable between first and second positions in which it respectively establishes and blocks fluid communication between said inlet port and said outlet port, and a bias spring cooperating with said first valve for biasing said first valve toward said first position at a given set pressure serving as said reference pressure, said reference pressure setting means controlling the force of said spring so as to adjust said set pressure to the level derived by said controller on the basis of said load condition indicative signal, said pressure control valve means including a reference pressure setting means for setting a reference pressure, which reference pressure setting means comprises a pressure accumulator chamber in said housing connected to said inlet port via a second fluid passage, a pressure responsive piston disposed within said pressure accumulator chamber and cooperating with said spring for adjusting said set pressure depending upon its position, and a pressure accumulation control valve disposed within said second fluid passage and movable between first and second positions in which it respectively establishes and blocks fluid communication between said pressure accumulator chamber and said inlet port, said pressure accumulation control valve incorporating an electrically operable actuator connected to said controller, said actuator being normally inoperative to allow said pressure accumulation control valve to assume its first position and responsive to said control signal to actuate said pressure accumulation control valve to said second position so as to hold the fluid pressure in said pressure accumulator chamber at said reference pressure, said valve means conducting said hydraulic pressure from said master cylinder to said wheel cylinder so as to increase the hydraulic pressure in said wheel cylinder at a rate matching the rate of increase of the hydraulic pressure in said master cylinder while the hydraulic pressure in said master cylinder is below said reference pressure, and to increase the hydraulic pressure in said wheel cylinder at a controlled rate related to the rate of increase of the hydraulic pressure in said master cylinder when the master cylinder pressure exceeds said reference pressure, said pressure control valve means further comprising a pressure responsive valve disposed within said second fluid passage for adjusting fluid pressure in said pressure accumulator chamber, said pressure responsive valve being sensitive to the rate of increase of fluid pressure at said inlet port and adjusting the fluid flow rate through said second fluid passage so as to increase the fluid pressure in said pressure accumulator chamber at a controlled rate related to the rate of increase of the fluid pressure at said inlet port;
a detector for detecting the load on the vehicle and producing a load condition indicative signal;
a sensor for monitoring the hydraulic pressure in said master cylinder and producing a pressure indicative signal; and
a controller responsive to said load condition indicative signal to derive said reference pressure value corresponding to said reference pressure to be set by said reference pressure setting means on the basis of a predetermined relationship between the load condition indicative signal value and the reference pressure value, said controller responsive to a pressure indicative signal value exceeding said reference pressure value to output a control signal ordering said reference pressure setting means to set the reference pressure at the level derived on the basis of said load condition indicative signal value.

5. The brake system as set forth in claim 4, wherein said detector comprises a level detector which monitors vertical separation between a sprung mass and an unsprung mass of the vehicle and produces a load condition indicative signal with a value representative of the vertical separation between said sprung mass and unsprung mass.

6. A proportioning valve device for a hydraulic automotive brake system which includes a master cylinder for accumulating hydraulic pressure to a level related to the disposition of a manually operable brake application means, a wheel cylinder for receiving said hydraulic pressure from said master cylinder via a hydraulic circuit and applying braking force to a vehicular wheel, said proportioning valve being disposed within said hydraulic circuit and comprising:
a housing with a first fluid path connecting an inlet port connected to said master cylinder and an outlet port connected to said wheel cylinder;
a first valve disposed within said fluid path and movable between first and second positions in which it respectively establishes and blocks fluid communication between said inlet port and said outlet port;
a bias spring for biasing said first valve toward said first position at a given set pressure serving as a reference pressure;
a reference pressure setting means cooperating with said spring to adjust said set pressure of said spring, said reference pressure setting means including a pressure accumulating means for receiving a pressurized fluid from said master cylinder for accumulating fluid pressure therein and adjusting said set pressure of said bias spring, said reference pressure setting means including means responsive to a rate of increase of said fluid pressure at said master cylinder for adjusting a rate of introduction of said pressurized fluid so as to increase the fluid pressure in said pressure accumulating means at a controlled rate related to the rate of increase of the fluid pressure at said master cylinder such that, at a high rate of increase of pressure at said master cylinder, the rate of increase of pressure in said pressure accumulating means is less than that at said master cylinder;
a detector sensitive to the load on the vehicle for producing a load condition indicative signal;
a sensor for monitoring the hydraulic pressure in said master cylinder and producing a pressure indicative signal; and a controller responsive to said load condition indicative signal to derive a reference pressure value corresponding to said reference pressure to be set by said reference pressure setting means on the basis of a predetermined relationship between the load condition indicative signal value and said reference pressure, said controller being responsive to a pressure indicative signal value exceeding said reference pressure value to output a control signal ordering said reference pressure setting means to set the reference pressure to the level derived on the basis of said load condition indicative signal value.

7. The proportioning valve device as set forth in claim 6, wherein said reference pressure setting means comprises a pressure accumulator chamber in said housing connected to said inlet port via a second fluid passage, a pressure responsive piston disposed within said pressure accumulator chamber and cooperating with said spring to adjust said set pressure depending upon its position, and a pressure accumulation control valve disposed within said second fluid passage and movable between first and second positions in which it respectively establishes and blocks fluid communication between said pressure accumulator chamber and said inlet port, said pressure accumulation control valve incorporating an electrically operable actuator connected to said controller, said actuator being normally inoperative to allow said pressure accumulation control valve to assume its first position and responsive to said control signal to actuate said pressure accumulation control valve to said second position so as to hold the fluid pressure in said pressure accumulator chamber at said reference pressure.

8. The brake system as set forth in claim 7, wherein said pressure control valve means further comprises a pressure responsive valve disposed within said second fluid passage for adjusting the fluid pressure in said pressure accumulator chamber, said pressure responsive valve being sensitive to the rate of increase of the fluid pressure at said inlet port and adjusting the fluid flow rate through said second fluid passage so as to increase the fluid pressure in said pressure accumulator chamber at a controlled rate related to the rate of increase of the fluid pressure at said inlet port.

9. The brake system as set forth in claim 8, wherein said detector comprises a level detector which to monitors the vertical displacement between a sprung mass and an unsprung mass of the vehicle and produces said load condition indicative signal with a value representative of the vertical displacement between said sprung mass and unsprung mass.

* * * * *